3,236,758
PRODUCTION OF α-HALOARYLACETIC ACIDS
Henry Peter Crocker, North Balwyn, Victoria, Australia, and Ronald William Kay, Kirkella, England, assignors to The Distillers Company Limited, Edinburgh, Scotland, a British company
No Drawing. Filed Aug. 7, 1962, Ser. No. 215,275
Claims priority, application Great Britain, Sept. 14, 1961, 32,925/61
11 Claims. (Cl. 204—158)

The present invention relates to the halogenation of substituted acetic acids, and in particular to the α-halogenation of arylacetic acids.

While substituted acetic acids react with halogens in the absence of a catalyst, this reaction may be very slow, particularly with bromine. Unspecific catalysts such as red phosphorus, carbon disulphide and acetic anhydride have been proposed, but these have little beneficial effect on the reaction rate of arylacetic acids with halogens, and often lead to the production of ring-substituted halogen derivatives. In addition, the product is always contaminated with catalyst, and frequently with undesired by-products. Thus, in the bromination of phenylacetic acid, the product contains α-bromophenylacetyl bromide. It is an object of the present invention to provide a process for the production of α-haloarylacetic acids in high yield and purity from arylacetic acids and halogens.

According to the present invention the process for the production of an α-haloarylacetic acid comprises reacting an arylacetic acid with a halogen while irradiating the reactants with ultra-violet light.

The halogen reactant is preferably present in excess over the stoichiometric quantity. The reaction of the present invention is preferably applied to the production of α-bromoarylacetic acids; for example, α-bromophenylacetic acid may be obtained by this method from bromine and phenylacetic acid.

When a mixture of bromine and molten phenylacetic acid is exposed to ultra-violet radiation, an extremely rapid reaction takes place, and α-bromophenylacetic acid is formed substantially uncontaminated by other halogen derivatives. In this way, however, the product may contain certain other impurities which may be difficult to remove. Accordingly it is preferred to carry out the reaction in the presence of an inert diluent.

The inert diluent may be any material inert to the reactants concerned which is a solvent for at least one reactant. It is preferred that the diluent shall be a good solvent for both reactants; in the reaction of bromine with phenylacetic acid, carbon tetrachloride is a particularly suitable solvent.

In one form of the present invention, an arylacetic acid, such as phenylacetic acid, is dissolved in carbon tetrachloride, and bromine is added to the solution. The resulting reaction mixture is irradiated with ultra-violet light, whereupon a rapid and exothermic reaction occurs. The heat of reaction is conveniently controlled by allowing the solvent to reflux.

During the reaction, hydrogen bromide is evolved, and some bromine is carried out of the reaction mixture by the hydrogen bromide. This entrained bromine does not condense readily, and is conveniently removed by scrubbing with a suitable solvent, such as carbon tetrachloride. The solution of bromine in the solvent may be recycled to the reactor, and the hydrogen bromide may be absorbed in water or alkali. The evolution of hydrogen bromide may, if desired, be controlled by adding the bromide gradually to a solution of the arylacetic acid in carbon tetrachloride; alternatively, both reagents may be introduced continuously into a reactor or series of reactors.

The α-haloarylacetic acid is preferably recovered from the reaction product mixture by crystallization from the inert diluent. Thus, α-bromophenylacetic acid may be recovered by cooling the reaction product in carbon tetrachloride solution, and initiating the crystallization, if necessary, with pure α-bromophenylacetic acid. Almost colorless crystals of the desired product are deposited and are of high purity. Small amounts of colored by-products and any unchanged phenylacetic acid remain in the mother-liquor, which may be recycled to the reactor.

The following example further illustrates the invention.

*Example*

408.3 grams (3 moles) of phenylacetic acid was dissolved in 957 grams of carbon tetrachloride in a three litre reaction vessel and the solution was heated to boiling under a reflux condenser. 528 grams of bromine (3.3 mole) was added over 60 minutes and the bromine entrained with the evolved hydrogen bromide was scrubbed from the effluent gases with carbon tetrachloride, the solution being returned to the reactor. The reactants were irradiated with ultra-violet light from a 500-watt lamp, and the reaction was complete in 170 minutes. The product solution was concentrated to a volume of 700 ml. and 521.7 grams of nearly colorless α-bromophenylacetic acid was obtained on cooling. The yield, based on the phenylacetic acid fed was 80.8%, the melting point of the product was 78.5°–82° C., and the replaceable bromide was 102% of the theoretical. The mother-liquor was returned to the reactor, when a further quantity of product was obtained. The overall yield was almost quantitative.

By way of comparison with the above example, the reaction of bromine with phenylacetic acid was carried out in the absence of any catalyst, and using red phosphorous and carbon disulphide as catalyst in three comparative experiments.

In the first experiment 5 moles of phenylacetic acid in carbon tetrachloride (24% w./w.) was refluxed, and 5.25 moles of bromine (65% w./w. in carbon tetrachloride) was slowly added, with return of entrained bromine to the reactor. After 27 hours reflux there was no increase in the base temperature. The solution was diluted with 5 litres of carbon tetrachloride and refluxed for a further 48 hours, after which the conversion to α-bromophenylacetic acid was 53.2% based on the phenylacetic acid fed.

In a second experiment, one mole of phenylacetic acid in solution in carbon tetrachloride (8% w./w.) was refluxed in the presence of 0.04 gm. of red phosphorus and 1.05 moles of bromine was added over 3¾ hours as a 38.5% w./w. solution in carbon tetrachloride. The reaction was continued for 24 hours with return of entrained bromine. After removal of the solvent 224 grams of material which, on recrystallization from petroleum ether gave 182 grams of product having M. Pt. 39.5°–60.5° C. The conversion of the phenylacetic acid to α-bromophenylacetic acid was only 24.6% and extensive ring bromination had taken place.

Finally, the reaction was carried out using carbon disulphide as a catalyst. This catalyst is known in the production of α-bromoacetic acid. In this experiment, two moles of phenylacetic acid, together with 0.07 mole of carbon disulphide, was refluxed with two litres of carbon tetrachloride. 2.1 moles of bromine was added over 2½ hours with return of entrained bromine. Hydrogen bromide was evolved at a rate of 0.08 mole per hour, indicating no significant catalysis of the reaction.

We claim:

1. The process for the production of an α-haloarylacetic acid which comprises reacting an arylacetic acid with a halogen in the presence of ultra-violet light as a catalyst.

2. The process as claimed in claim 1 in which the halogen is bromine.

3. The process as claimed in claim 2 in which bromine, removed from the reaction mixture by entrainment with the hydrogen bromide produced in the reaction, is recovered by scrubbing with a suitable organic solvent and returned to solution for recycling.

4. The process as claimed in claim 1 in which the reaction takes place in an inert diluent.

5. The process as claimed in claim 4 in which the inert diluent is a solvent for both reactants.

6. The process as claimed in claim 4 in which the inert diluent is carbon tetrachloride.

7. The process as claimed in claim 4 in which the heat of reaction is removed by refluxing the inert diluent.

8. The process as claimed in claim 4 in which the $\alpha$-haloarylacetic acid is recovered by crystallization from solution in the inert diluent.

9. The process as claimed in claim 3 in which the halogen is present in the reactant mixture in excess over the stoichiometric quantity.

10. The process as claimed in claim 1 in which the arylacetic acid is dissolved in an inert diluent, bromine is added to the solution, and the solution is irradiated with ultra-violet light.

11. The process for the production of $\alpha$-bromophenylacetic acid which comprises reacting phenylacetic acid with elemental bromine in the presence of ultra-violet light as a catalyst.

References Cited by the Examiner

UNITED STATES PATENTS 2,816,134  12/1957  Toland _____ 204—158.5

FOREIGN PATENTS 3,053  5/1914  Great Britain.

JOHN H. MACK, *Primary Examiner.*